United States Patent [19]

Sandberg

[11] Patent Number: 4,697,308
[45] Date of Patent: Oct. 6, 1987

[54] PATTY MOLDING MECHANISM FOR WHOLE FIBER FOOD PRODUCT

[75] Inventor: Glenn A. Sandberg, Lockport, Ill.

[73] Assignee: Formax, Inc., Mokena, Ill.

[21] Appl. No.: 924,562

[22] Filed: Oct. 29, 1986

[51] Int. Cl.[4] ............................................. A22C 7/00
[52] U.S. Cl. ....................................................... 17/32
[58] Field of Search .................. 17/32; 425/235, 531, 425/553, 307

[56] References Cited

U.S. PATENT DOCUMENTS

| RE 30,096 | 9/1979 | Richards . | |
|---|---|---|---|
| 3,939,530 | 2/1976 | Holly . | |
| 3,964,127 | 6/1976 | Holly . | |
| 4,054,967 | 10/1977 | Sandberg et al. . | |
| 4,097,961 | 7/1978 | Richards . | |
| 4,182,003 | 1/1980 | Lamartino et al. . | |
| 4,212,609 | 7/1980 | Fay . | |
| 4,276,318 | 6/1981 | Orlowski . | |
| 4,356,595 | 11/1982 | Sandberg et al. . | |
| 4,380,423 | 4/1983 | Aoki .............................. | 425/531 X |
| 4,541,143 | 9/1985 | Holly . | |

Primary Examiner—Willie G. Abercrombie
Attorney, Agent, or Firm—Kinzer, Plyer, Dorn, McEachran & Jambor

[57] ABSTRACT

A molding mechanism for molding food patties from a whole fiber food product (e.g. poultry breasts, fish filets, large pieces of pork muscle, etc.) comprising a mold plate interposed between planar surfaces of a cover member and a fill member and moving cyclically between a fill position and a discharge position, the mold plate including plural mold cavities that are aligned one-for-one with fill apertures in the fill member through which the food product is pumped under substantial pressure when the mold plate is in its fill position. A plurality of shear blades, one for each mold cavity, are positioned adjacent the fill member intermediate the fill and discharge positions of the mold plate; the shear blades are driven into engagement with the mold plate each time the mold plate moves toward its discharge position to shear food fibers trailing from the mold cavities between the mold plate and the fill member. A plurality of knives, projecting from the portions of the fill member intermediate the fill apertures, cut food product segments that would otherwise bridge those portions of the fill member.

17 Claims, 8 Drawing Figures

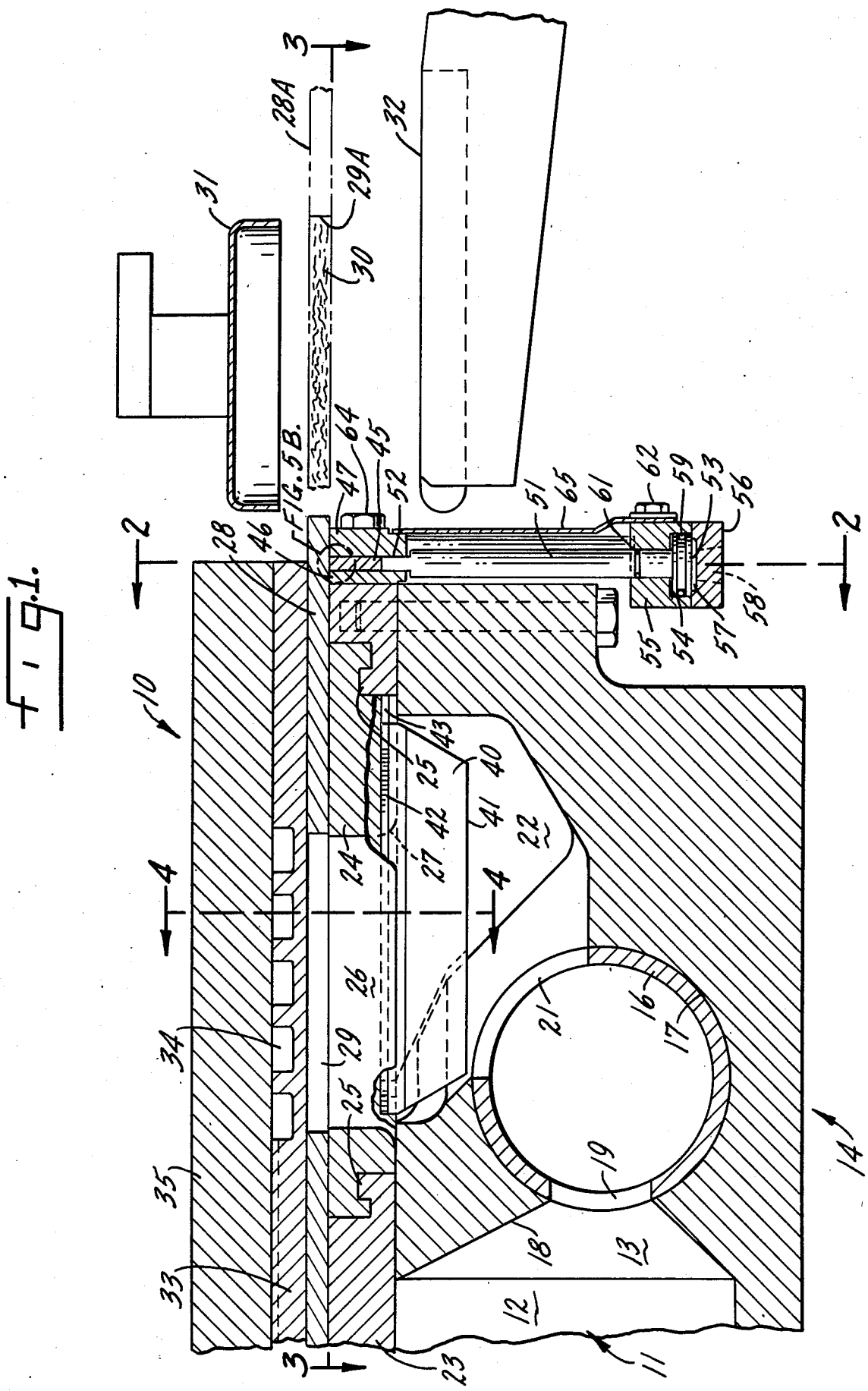

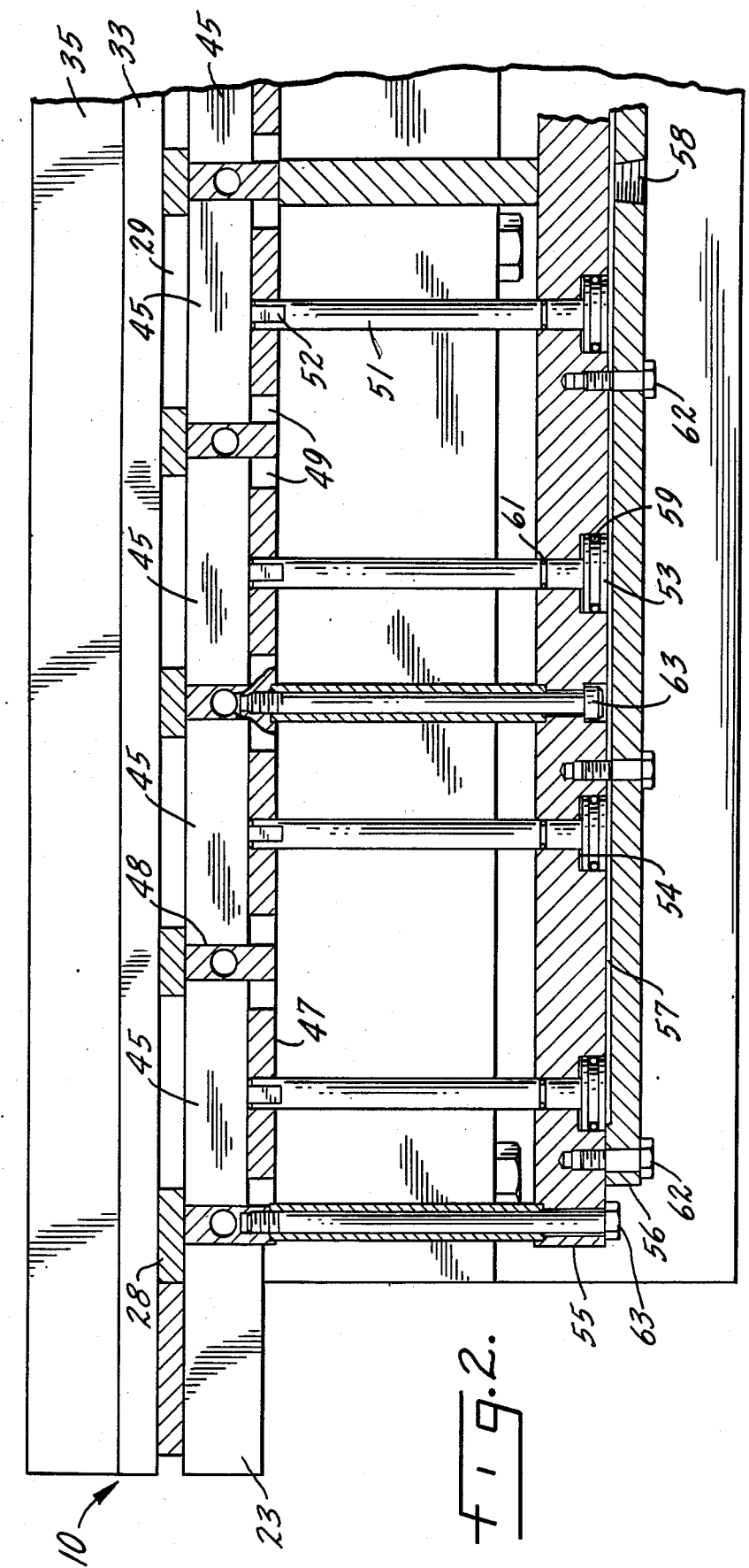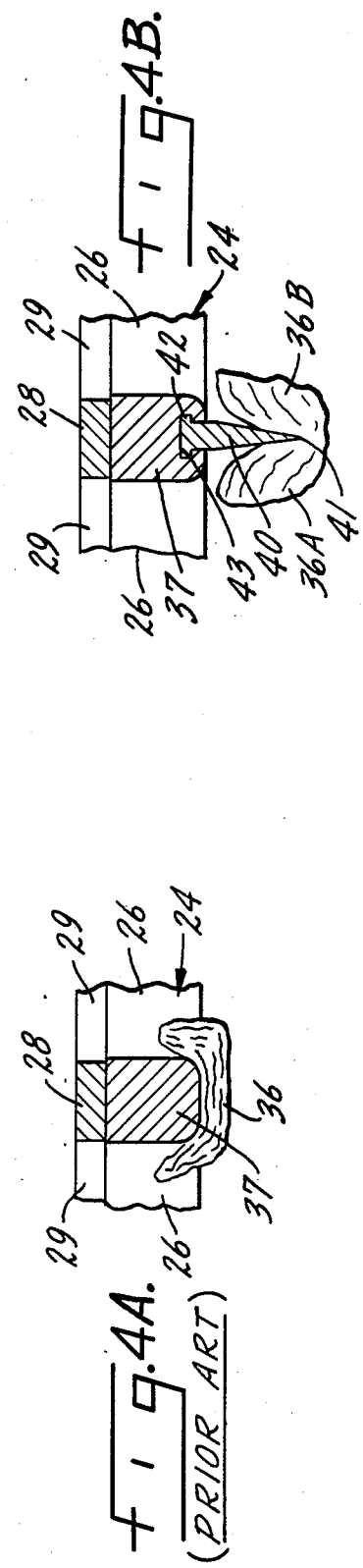

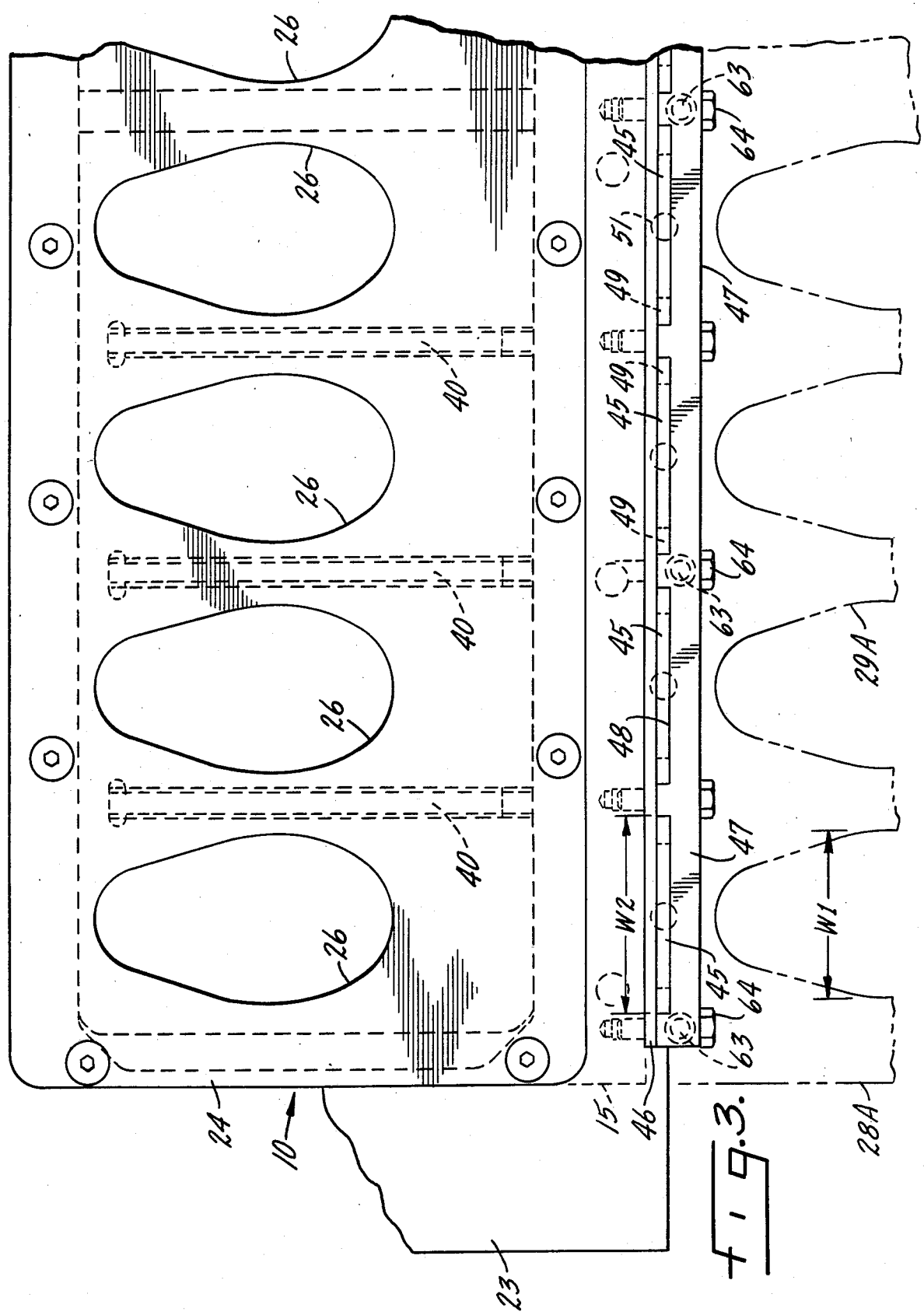

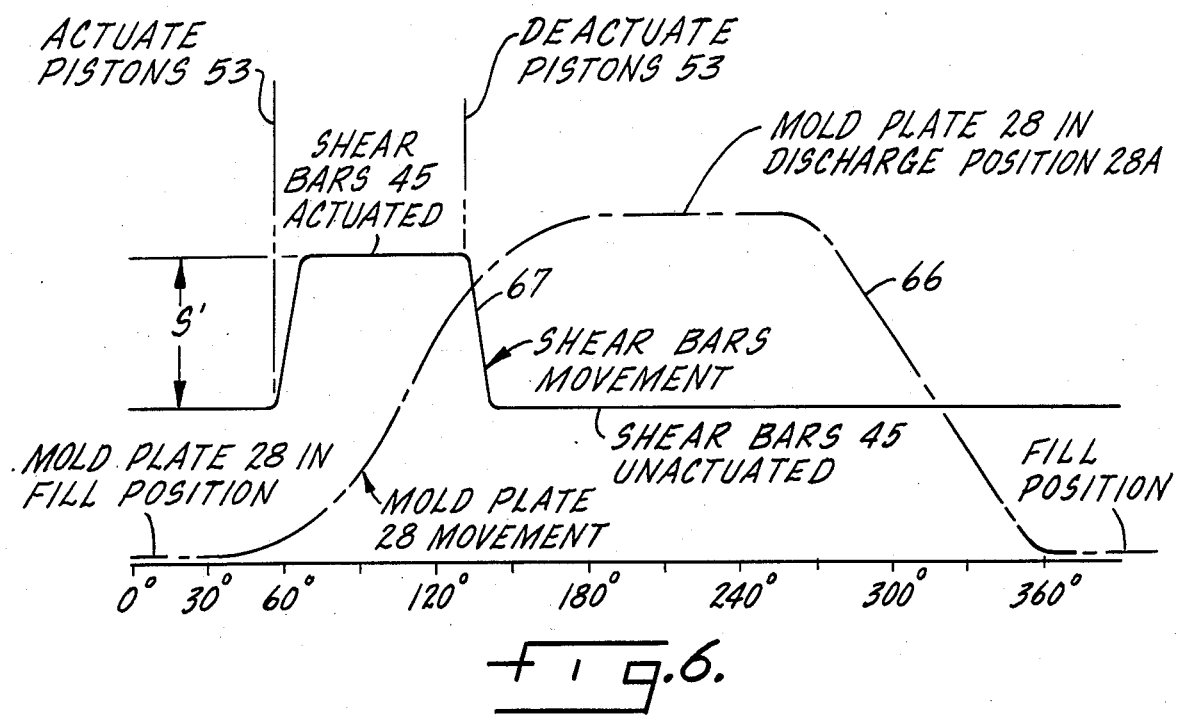
Fig. 6.
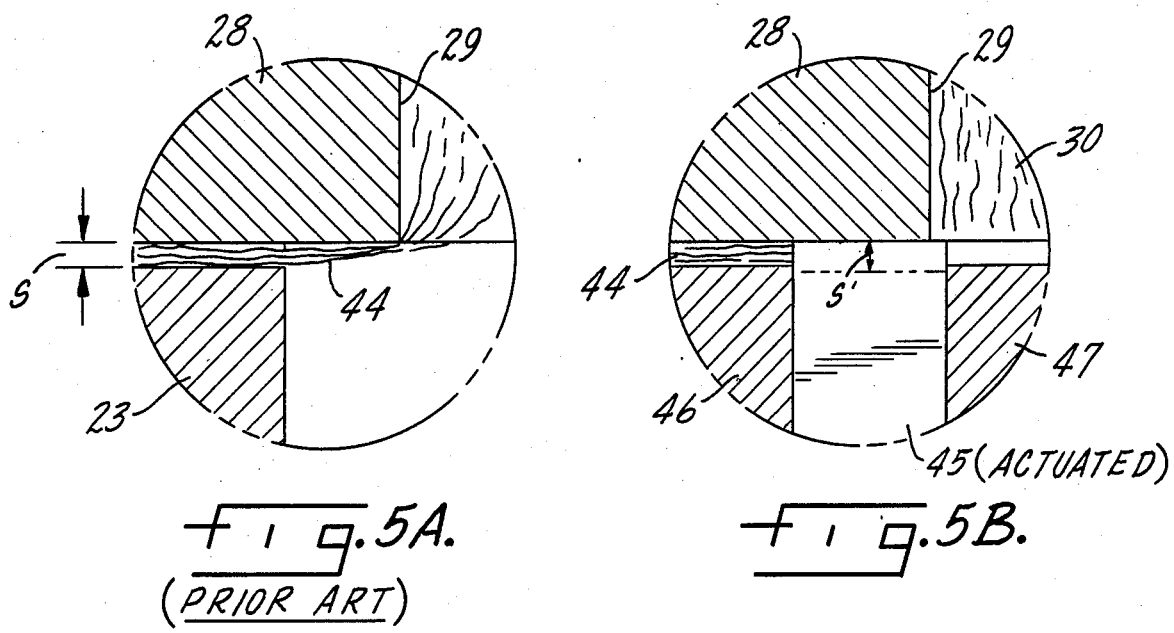
Fig. 5A. (PRIOR ART)
Fig. 5B.

PATTY MOLDING MECHANISM FOR WHOLE FIBER FOOD PRODUCT

BACKGROUND OF THE INVENTION

Food patties of various kinds, including hamburgers, molded "steaks", fish cakes, poultry patties, pork patties, and various vegetable patties are frequently formed in high volume automated molding machines. Patty molding machines adaptable to any of these food products which have proven quite successful are described in Richards Reissue U.S. Pat. No. Re. 30,096 reissued Sept. 18, 1979, Sandberg et al U.S. Pat. Nos. 4,054,967 issued Oct. 25, 1977, and Lamartino et al 4,182,003 issued Jan. 8, 1980.

Although any of those machines, and others as well, are capable of producing food patties of consistent size, weight, and configuration on a high volume basis, substantial problems may be encountered when the machines are required to mold patties from food products which, unlike hamburger, have not been ground to relatively small particle size. Thus, in many instances it may be desirable to form food patties from a food product that has not been chopped or ground into a consistent small particle material. For example, it may be desirable to mold food patties from a starting material consisting of whole poultry breasts, large segments of pork or other meat, or large fish filets. In this specification and in the appended claims, a food product of this kind is referred to as a "whole fiber food product".

A molding mechanism that solves some of the problems encountered in molding food patties from a whole fiber food product is described in Sandberg et al U.S. Pat. No. 4,356,595 issued Nov. 2, 1982. In one form of the molding mechanism described in that patent, using a plural cavity mold plate disposed in close-fitting relationship between planar surfaces of a fill member and a cover member, the food product is pumped into mold cavities in the mold plate through aligned fill apertures in the fill member. The fill apertures are preferably matched in size and configuration to the mold cavities. However, even that molding mechanism presents some technical problems in its operation when employed to mold patties from whole fiber food products.

In a molding mechanism of this kind, the total clearance between the mold plate and the adjacent cover member and fill member is only about 0.001 inch to 0.003 inch (0.025 cm. to 0.076 cm.). When the food product is pumped into the mold plate cavities it is under relatively high pressure; the pumping pressures may be as high as 400 psi (28 Kg/sq. cm.) in the machine of the Richards patent, 220 psi (15.5 Kg/sq. cm.) in the mechanism of the Lamartino patent, and 250 psi (17.6 Kg/sq.cm.) in the Sandberg et al U.S. Pat. No. 4,054,967. This high pressure tends to force the mold plate into firm contact with the cover member, leaving all of the available clearance as a minute space between the mold plate and the fill member. When the mold plate moves from its fill position toward its discharge position, fibers of the food product tend to be pulled into this very limited space between the mold plate and the fill member, trailing behind the mold cavity. When the knockout or discharge cups are moved through the mold plate cavity to discharge the molded food patties, these trailing fibers, still trapped at their extremities between the mold plate and the fill member, tend to function as a hinge. This hinge effect causes irregular registration of patties on the takeaway conveyor and may even pull the patties apart, leading to difficulties at subsequent processing stations. The trailing fibers also detract from the final appearance of the patties.

Another problem encountered in the molding of food patties from whole fiber food products occurs because large portions of the food product may tend to bridge the portions of the fill member between the fill apertures. When this occurs, the bridging portion of the whole fiber food product is torn as the high pressure pumping action forces it into the fill apertures and then into the mold cavities. This tearing action destroys the fibrous integrity of the product and may have a noticeable adverse effect on the texture of the molded patties.

One expedient that has been used to ameliorate both of these problems has been to chill the whole fiber food product before it is introduced into the food patty molding machine. However, chilling is relatively expensive and tends to reduce the operating efficiency of the molding machines. Furthermore, if the chilling is sufficient to partially freeze portions of the product, which is often the case, damage to the cellular integrity of the food product may occur with a resultant adverse effect on the texture for the molded patties.

SUMMARY OF THE INVENTION

It is a principal object of the present invention, therefore, to provide a new and improved food patty molding mechanism, particularly adapted for molding food patties of whole fiber food products that does not require substantial chilling of the food product yet minimizes the problems and difficulties described above.

Another object of the invention is to provide a new and improved food patty molding mechanism, adapted for use with whole fiber food products, that effectively cuts any fibers trailing from the mold cavity into the space between the mold cavity and the fill member and thus eliminates difficulties from this source.

Another object of the invention is to provide a new and improved food patty molding mechanism, adapted to use with whole fiber food products, that effectively cuts any food product segments tending to bridge the portions of the fill member between its fill apertures to preclude tearing of those portions of the food product.

Accordingly, the invention relates to a molding mechanism for molding food patties from a whole fiber food product, comprising a fill member having a planar surface and having at least one fill aperture through that surface, a cover member having a planar surface disposed in parallel spaced relation to the planar surface of the fill member, and a mold plate having opposed planar surfaces, positioned between the planar surfaces of the fill member and the cover member in close fitting relation thereto, the mold plate having at least one mold cavity of given maximum width W1 therethrough. Mold plate drive means are provided for cyclically moving the mold plate between a fill position in which the mold cavity is aligned with the fill aperture and a discharge position in which the mold cavity is displaced a short distance beyond one side of the fill member, together with pump means for pumping a whole fiber food product under pressure through the fill aperture and into the mold cavity to form a food patty in the mold cavity and knockout means for pushing a molded food patty from the mold cavity at the discharge position of the mold plate. A shear blade, having a linear shearing edge with a width W2 substantially exceeding the maximum mold cavity width W1, is positioned adjacent the one side of the fill member and is actuatable between an unactuated position, in which its shearing edge does not project substantially beyond the level of the planar surface of the fill member toward the mold plate, and a shearing position in which its shearing edge projects a very short distance beyond the level of the planar surface of the fill member toward the mold plate. Shear blade drive means for cyclically actuating the shear blade in coordination with movement of the mold plate, driving the shear blade to its shearing position as the mold plate moves toward its discharge position to shear food product fibers trailing from the side of the mold cavity adjacent the fill member, and releasing the shear blade to return to its unactuated position before the mold plate begins to return to its fill position.

BRIEF DESCRIPTION OF THE DRAWINGS

FIG. 1 is a sectional side elevation view of a food patty molding mechanism constructed in accordance with a preferred embodiment of the invention;

FIG. 2 is a sectional front elevation view of one-half of the molding mechanism taken approximately as indicated by line 2—2 in FIG. 1, the other half being a mittot duplicate of that shown;

FIG. 3 is a sectional plan view of one-half of the molding mechanism, taken approximately as indicated by line 3—3 in FIG. 1, the other half being a mirror duplicate of that shown;

FIGS. 4A and 4B are before-and-after detail sectional views taken approximately as indicated by line 4—4 in FIG. 1;

FIGS. 5A and 5B are before-and-after detail views, on an enlarged scale, of a part of the molding mechanism, taken approximately as indicated by the encircled portion marked "FIG. 5" in FIG. 1; and FIG. 6 is a timing chart used to explain operation of a portion of the molding mechanism.

DESCRIPTION OF THE PREFERRED EMBODIMENTS

FIGS. 1-3 illustrate a food patty molding mechanism 10 for molding food patties from a whole fiber food product. Molding mechanism 10 is of the kind described and illustrated in greater detail in the aforementioned Richards U.S. Pat. No. Re. 30,096 and includes the improved structural and operational features disclosed in connection with FIG. 8 of the aforementioned Sandberg et al U.S. Pat. No. 4,356,595. The disclosures of those two prior U.S. patents are incorporated in this specification by reference, and familiarity with them is assumed.

Molding mechanism 10, FIG. 1, includes two pumps 11 that are not shown in detail; only the outlet portion 12 of one pump chamber is shown in the drawings. The two pumps operate in alternation to afford a continuous pumping action. From chamber 12 one of the pumps 11 pumps a whole fiber food product through a slot 13 into a pump manifold 14. Pump manifold 14 includes a valve cylinder 16 fitted into an opening 17 immediately beyond the pump chamber wall 18 that defines slot 13. Valve cylinder 16 includes two intake slots; only one of these intake slots 19 is illustrated. Valve intake slot 19 is alignable with the outlet slot 13 for pump chamber 12. Rotation of valve cylinder 16 is effective to move the valve intake slot 19 out of alignment with pump outlet slot 13 when the second pump of the patty molding machine is in operation. Valve cylinder 16 also includes an elongated outlet slot 21 aligned with a fill passage 22 in manifold 14.

The upper part of manifold 14 is covered by a fill plate 23 that includes a fill plate insert 24. Fill plate 23 and insert 24 are referred to conjointly herein as the "fill member" of mechanism 10. Insert 24 is keyed into fill plate 23 by a plurality of keys 25. Fill plate insert 24 extends across the full operating width of molding mechanism 10 and includes a plurality of fill apertures 26; see FIGS. 1 and 3. In the illustrated molding mechanism 10 there are eight fill apertures 26, four of the apertures being shown in FIG. 3. The bottom corners of fill apertures 26 are preferably rounded as indicated at 27 in FIG. 1.

A mold plate 28 is slidably supported upon a planar upper surface of the fill member comprising fill plate 23 and fill plate insert 24, as shown in FIGS. 1 and 2. Mold plate 28 is cyclically slidably movable from the fill position shown in solid lines in FIG. 1 to the discharge or knockout position shown in phantom lines 28A. The mold plate drive means is not shown in the drawings; appropriate mold plate drives are well known in the art. Mold plate 28 includes a plurality of mold cavities 29 that are aligned with and conform closely to the size and configuration of fill apertures 26. The size and configuration of the mold cavities is indicated by the phantom outlines 29A in FIG. 3, in which the mold cavities are shown in the discharge position for the mold plate.

A series of knockout cups 31 are included in molding mechanism 10, one knockout cup 31 for each mold cavity 29. Whenever mold plate 28 is in its discharge position 28A, each of its mold cavities is in the position 29A aligned with one of the knockout cups 31. Knockout cups 31 conform closely in size and configuration to the mold cavities with which they are associated. A takeaway conveyor 32 is positioned below mold plate 28 in position to receive molded food patties dislodged from the mold cavities by knockout cups 31.

A breather plate 33 is positioned immediately above mold plate 28 in molding mechanism 10. Plate 33 is provided with a plurality of air pressure release passages 34. A cover plate 35 is positioned above breather plate 33, closing off the top surfaces of breather passages 34. Plates 33 and 35 are referred to conjointly herein as the "cover member" of molding mechanism 10.

As thus far described, molding mechanism 10 is well known in the art from the aforementioned U.S. patents to Richards and Sandberg et al and from the Formax 26 patty molding machines manufactured and sold by Formax, Inc. of Mokena, Ill., U.S.A. In the operation of molding mechanism 10, a supply of a moldable food product is pumped under pressure from one of the pumps 11 through valve slots 19 and 21 and into fill passage 22. The food product, under relatively high pressure, also fills each of the fill apertures 26 in fill plate insert 24. When processing a whole fiber food product, the pressure on the food product is usually quite high, of the order of 200 psi (14 Kg/sq.cm.) or more.

With mold plate 28 in the fill position shown in FIG. 1, the food product is forced under pressure through passage 22 and apertures 26 into each of the mold cavities 29, filling the mold cavities. After the mold cavities have been filled, mold plate 28 is advanced to the discharge position shown by phantom outline 28A. When the mold plate reaches that position, knockout cups 31 are driven downwardly, discharging the molded food patties 30 from the mold cavities 29 (at position 29A, FIG. 1) onto takeaway conveyor 32. The knockout cups are then retracted and mold plate 28 is moved back to its fill position to receive a new charge of food product in each of its mold cavities 29. This cycle of operation is continued indefinitely; the cycle rate for mold plate 28 may be as high as eighty or ninety cycles per minute. As long as molding mechanism 10 is in operation, the food product is maintained under constant or intermittent high pressure in pump chamber 12 (or in the second pump), valve cylinder 16, fill passage 22, and fill apertures 26.

When a whole fiber food product is being molded in mechanism 10, large portions 36 of the food product tend to become draped across the webs 37 between fill apertures 26 in the fill plate insert 24 as shown in FIG. 4A. As the food product is continuously pumped through molding mechanism 10, this particular piece 36 of food product would be torn apart as the pressure forces the food product through two adjacent fill apertures 26 into mold cavities 29. This tearing action destroys the fibrous integrity of the whole fiber food product and has a decided adverse effect upon the texture of the molded food patties produced by the molding mechanism.

In molding mechanism 10, the tearing of portions of the whole fiber food product as described in connection with FIG. 4A is effectively minimized and for the most part eliminated by a series of knives 40 shown in FIGS. 1, 3 and 4B. Preferably, there is one knife between each adjacent pair of fill apertures 26. In some machines, which have a central support member in the fill passage 22, it may be necessary to eliminate a knife between the two central fill apertures 26.

Each knife 40 is T-shaped in cross section (FIG. 4B), having a downwardly extending leg terminating in a sharp point 41 and a head 42 at the top of the knife. Each knife 40 has its head 42 inserted in a T-shaped slot 43 milled into one of the webs 37 between fill apertures 26 in fill plate insert 24.

When a portion 36 of the whole fiber food product that would otherwise bridge one of the webs 37 between fill apertures 26 in fill member 23,24 encounters a knife 40, the food product portion is cut into two pieces 36A and 36B as shown in FIG. 4B. This cutting action preserves the integrity of the whole fiber food product and effectively precludes the deterioration in patty texture that results from the prior arrangement illustrated in FIG. 4A.

In molding mechanism 10, the total of the clearances at the top and bottom surfaces of mold plate 28, between the mold plate and breather plate 33 above and between the mold plate and the fill plate and insert 23, 24 below, is quite small, usually in the range of 0.001 to 0.003 inch (0.025 cm. to 0.076 cm.). When the mold plate moves outwardly from its fill position toward its discharge position, the pressure of the food product on the bottom of the mold plate forces it tight against the cover member, in this instance against breather plate 33, so that essentially all of this clearance appears as a space S between the bottom surface of mold plate 28 and the top surface of fill member 23,24 as the mold plate moves outwardly toward its discharge position.

For ground food products such as hamburger and for food products that have no fibers of substantial length, the "lifting" of mold plate 28, as just described, has no deleterious effect. With other food products, however, and particularly with whole fiber food products, substantial difficulties are encountered. As mold plate 28 slides toward its discharge position, food product fibers trailing from mold cavity 29 extend from the back of the mold cavity between mold plate 28 and fill member 23,24 as indicated by fibers 44 in FIG. 5A. Subsequently, when the knockout cups 31 move downwardly through the mold cavities in mold plate 28, these trailing fibers 44, still trapped in the clearance between plates 23 and 28, tend to function as a hinge. This hinge effect produces poor registration of patties 30 on takeaway conveyor 32, may cause the patties to be pulled apart, and detracts materially from the appearance of the patties. The poor registration of patties 30 on takeaway conveyor 32 also causes substantial problems at downstream processing stations, such as batter and breading and/or freezing and packaging stations.

In molding mechanism 10, this difficulty is effectively eliminated by use of a series of rectangular shear blades or bars 45, FIGS. 1-3. As most clearly shown in FIG. 3, there is one shear blade 45 aligned with each of the fill apertures 26 and hence aligned with each mold cavity; see cavities 29A. Shear blades 45 are positioned between and are held in place by an inner guide bar 46 disposed along the outer surface of fill member 23,24 and an outer guide bar 47 having a series of guide receptacles 48 for receiving the shear blades 45. Guide bar 47 is provided with a series of slots 49 at the bottom of each of the guide receptacles 48 to facilitate blade removal and replacement as described hereinafter. Each shear blade 45 has a width W2 exceeding the maximum width W1 of its associated mold cavity 29. In the illustrated construction all shear blades 45 have the same width W2 because mold cavities 29 are shown as having the same maximum width W1, but this condition may be varied in those instances where mold cavities of different shapes are employed.

Shear blades 45 are aligned one-for-one with a corresponding plurality of pusher rods 51. Each pusher rod 51 has a flat upper portion 52 that engages the bottom of one of the shear blades 45. A series of pistons 53 are aligned one-for-one with and engage the bottom ends of pusher rods 51. Each piston 53 is disposed within a short cylinder 54 formed in a manifold 55. Manifold 55 is closed, on its bottom surface, by a manifold cover 56 which has an elongated channel 57 in its top surface. Channel 57 interconnects all of cylinders 54 and pistons 53 with a central air inlet 58. Seals are provided for pistons 53 and pusher rods 51 by appropriate O-rings 59 and 61. Air inlet 58 is connected to a conventional fluid pressure source (not shown) such as an air compressor and accumulator capable of supplying air at a pressure of 60 psi (4.2 Kg/sq.cm.).

Manifold cover 56 is secured to manifold 55 by a series of bolts 62 (FIG. 2). A plurality of suspension bolts 63 support the manifold structure 55,56 from the outer guide bar 47 for shear blades 45. The guide structure comprising members 46 and 47 is firmly mounted upon fill plate 23 by a series of bolts 64. Of course, other appropriate mounting means may be provided as desired. A sheet metal front cover or guard 65 (FIG. 1) extends across all of this mechanism. Guard 65 protects rods 51, pistons 53 and manifold 55,56 against contact with food product.

The timing of operation of shear bars 45 is illustrated in FIG. 6, in which curve 66 illustrates a complete cycle of operation of mold plate 28 from its fill position to its discharge position 28A and back to its fill position, whereas curve 67 illustrates the operation of shear bars 45. With mold plate 28 in its fill position receiving food product (zero degrees in FIG. 6) there is no air pressure in channel 57 of manifold 55,56. For this operating condition, shear blades 45 are at or very slightly displaced below the level of the upper surface of fill member 23,24 so that the shear blades do not interfere with movement of mold plate 28 from its fill position to its discharge position.

As shown in FIG. 6, shortly after mold plate 28 begins its outward movement from the fill position to the the discharge position, pistons 53 are actuated. This is accomplished by introducing air under pressure through inlet 58 into the manifold channel 57, forcing each of the pistons 53 upwardly in its cylinder 54. The upward movement of each piston 53 drives its associated pusher rod 51 upwardly and this forces the associated shear blade 45 up into firm engagement with the bottom surface of mold plate 28 as the mold plate is emerging from molding mechanism 10. The pressure of engagement between each shear blade 45 and the bottom of mold plate 28 is substantial; it is determined by the air pressure in manifold 55,56 and by the geometry of pistons 53 and blades 45.

Referring again to FIG. 6, it is seen that actuation of pistons 53 ends shortly before mold plate 28 reaches its discharge position 28A. This is accomplished by shutting off the high pressure air supply to the manifold 55,56 for pistons 53 and allowing the manifold to return to a much lower pressure, usually atmospheric pressure. As a consequence, and as indicated by curve 67 in FIG. 6, shear bars 45 drop back down through the very limited distance S', which is only slightly larger than the maximum total clearance S between mold plate 28 and fill plate 23; compare FIGS. 5A and 5B. Distance S' should preferably be less than 0.05 inch (0.127 cm.).

The high pressure air supply for manifold 55,56 and the control for that air supply have not been illustrated. Any suitable high pressure air supply can be employed with a simple solenoid valve to control the air pressure at inlet 58 to the manifold. The sequencing control to synchronize operation of shear bars 45 with the cyclical operation of mold plate 28, not illustrated, may comprise a rotary electrical switch actuated by the mold plate drive.

The effect of the operation of shear bars 45 is illustrated in FIG. 5B. As mold cavities 29 in mold plate 28 emerge from molding mechanism 10 in the movement of mold plate 28 toward its discharge position, sharp leading edges on shear blades 45 cut the trailing fibers 44 of the whole fiber food product. Consequently, when mold plate 28 reaches its discharge position there is no tendency toward a hinging action on the discharge of the molded food patties, effectively eliminating the registration problems and other difficulties discussed above. Shear bars 45 make it possible to utilize molding mechanism 10 with whole fiber food products at substantially higher temperatures than would be permissible in the same mechanism not equipped with the shear bar apparatus, with a resultant substantial saving for the machine operator. This saving is accentuated by the fact that molding mechanism 10 can be operated with less loading on the mechanical drive components when the food product does not have to be chilled to a substantial extent. Of course, these advantages are accentuated when knives 40 are used in combination with shear blades 45, as shown in molding mechanism 10, particularly for some whole fiber food products such as complete poultry breasts, fish filets, and the like.

In molding mechanism 10 the path of movement for food product under pressure originates below mold plate 28, passing upwardly through valve cylinder 16, fill passage 22 and fill apertures 26 into mold plate cavities 29. In other molding mechanisms, such as those disclosed in the previously identified U.S. Pat. Nos. 4,054,967 Sandberg et al and 4,182,003, LaMartino et al this relationship is reversed. In those machines the pumps for the molding mechanisms are positioned above the mold plate so that the fill member is located above the mold plate and the cover member is located below the mold plate. The improvements of the present invention are equally applicable to these top-feed molding mechanisms, the knives 40 and the shear blades 45 being re-located above the mold plate rather than below it. In such top-fill machines, it is usually desirable to lenthen the mold plate so that it projects below the shear bars even when the mold plate is in its fill position in order to prevent the shear blades from interferring with mold plate movement. Otherwise, the construction and operation may be the same as previously described.

Shear blades 45 are preferably rectangular bars, as shown, with four sharp linear shearing edges. When one edge of a blade has become worn enough so that its cutting efficiency is materially reduced, it is a simple matter to insert a tool or tools into the two slots 49 in the outer guide bar below the worn shear blade. This makes it possible to lift the shear blade from its guide receptacle 48. The blade can then be turned and replaced in its receptacle with a new cutting edge in position.

I claim:

1. A molding mechanism for molding food patties from a whole fiber food product, comprising:

a fill member having a planar surface and having at least one fill aperture through that surface;

a cover member having a planar surface disposed in parallel spaced relation to the planar surface of the fill member;

a mold plate having opposed planar surfaces, positioned between the planar surfaces of the fill member and the cover member in close fitting relation thereto, the mold plate having at least one mold cavity of given maximum width W1 therethrough;

mold plate drive means for cyclically moving the mold plate between a fill position in which the mold cavity is aligned with the fill aperture and a discharge position in which the mold cavity is displaced a short distance beyond one side of the fill member;

pump means for pumping a whole fiber food product, under pressure, through the fill aperture and into the mold cavity to form a food patty in the mold cavity;

knockout means for pushing a molded food patty from the mold cavity at the discharge position of the mold plate;

a shear blade, having a linear shearing edge with a width W2 substantially exceeding the maximum mold cavity width W1, positioned adjacent the one side of the fill member and actuatable between an unactuated position, in which its shearing edge does not project substantially beyond the level of the planar surface of the fill member toward the mold plate, and a shearing position in which its shearing edge projects a very short distance beyond the level of the planar surface of the fill member toward the mold plate; and shear blade drive means for cyclically actuating the shear blade in coordination with movement of the mold plate, driving the shear blade to its shearing position as the mold plate moves toward its discharge position to shear food product fibers trailing from the side of the mold cavity adjacent the fill member, and releasing the shear blade to return to its unactuated position before the mold plate begins to return to its fill position.

2. A food patty molding mechanism according to claim 1, in which:

the mold plate includes a plurality of mold cavities spaced across the mold plate transversely to the direction of movement of the mold plate from its fill position to its discharge position;

the molding mechanism includes a plurality of shear blades; and the shear blade drive means actuates and releases all of the shear blades substantially simultaneously.

3. A food patty molding mechanism according to claim 2 in which:

the shear blades correspond in number to the number of mold cavities and the shear blades are aligned one-for-one with the mold cavities, each shear blade having a width W2 substantially exceeding the maximum width W1 of its associated mold cavity.

4. A food patty molding mechanism according to claim 3 in which the fill member has a plurality of fill apertures corresponding in number to and aligned one-for-one with the mold cavities in the mold plate, the size and configuration of each fill aperture corresponding substantially to the size and configuration of the associated mold cavity.

5. A food patty molding mechanism according to claim 4, and further comprising:

a fill passage connecting the fill apertures to the pump means;

and a plurality of knives mounted on the fill member, intermediate the fill apertures, the knives projecting into the fill passage for cutting food product segments that would otherwise tend to bridge the portions of the fill member between the fill apertures.

6. A food patty molding mchanism according to claim 4 in which the shear blade drive means comprises:

a plurality of pistons, corresponding in number to the number of shear blades, the pistons being aligned with and operatively connected one-for-one with the shear blades;

a manifold affording a corresponding number of cylinders, each cylinder encompassing one piston; and means for applying fluid under pressure substantially simultaneously to all of the cylinders, through the manifold, to drive all of the shear blades to their shearing positions.

7. A food patty molding mechanism according to claim 5 in which:

the operative connection between each shear blade and its associated piston is afforded by a pusher rod interposed therebetween;

the pistons are actuated by air under pressure; and the maximum travel for each piston is not substantially greater than 0.05 inch.

8. A food patty molding mechanism according to claim 7, and further comprising:

a fill passage connecting the fill apertures to the pump means;

and a plurality of knives mounted on the fill member, intermediate the fill apertures, the knives projecting into the fill passage for cutting food product segments that would otherwise tend to bridge the portions of the fill member between the fill apertures.

9. A food patty molding mechanism according to claim 3 in which each shear blade is of rectangular configuration affording four interchangeable shearing edges.

10. A food patty molding mechanism according to claim 9 and further comprising inner and outer guide bars mounted on the fill member and extending across the one side of the fill member, the guide bars conjointly defining a plurality of shear blade receptacles, each shear blade receptacle holding and guiding movement of one shear blade.

11. A food patty molding mechanism according to claim 10 in which the outer guide bar includes a plurality of externally accessible slots, two for each shear bar receptacle, facilitating removal of the shear bars from their receptacles.

12. A food patty molding mechanism according to claim 11, and further comprising:

a fill passage connecting the fill apertures to the pump means;

and a plurality of knives mounted on the fill member, intermediate the fill apertures, the knives projecting into the fill passage for cutting food product segments that would otherwise tend to bridge the portions of the fill member between the fill apertures.

13. A food patty molding mechanism according to claim 10 in which the fill member has a plurality of fill apertures corresponding in number to and aligned one-for-one with the mold cavities in the mold plate, the size and configuration of each fill aperture corresponding substantially to the size and configuration of the associated mold cavity.

14. A food patty molding mchanism according to claim 13 in which the shear blade drive means comprises:

a plurality of pistons, corresponding in number to the number of shear blades, the pistons being aligned with and operatively connected one-for-one with the shear blades;

a manifold affording a corresponding number of cylinders, each cylinder encompassing one piston; and means for applying fluid under pressure substantially simultaneously to all of the cylinders, through the manifold, to drive all of the shear blades to their shearing positions.

15. A food patty molding mechanism according to claim 14 in which:

the operative connection between each shear blade and its associated piston is afforded by a pusher rod interposed therebetween;

the pistons are actuated by air under pressure; and the maximum travel for each piston is not substantially greater than 0.05 inch.

16. A food patty molding mechanism according to claim 15, and further comprising:

a fill passage connecting the fill apertures to the pump means;

and a plurality of knives mounted on the fill member, intermediate the fill apertures, the knives projecting into the fill passage for cutting food product segments that would otherwise tend to bridge the portions of the fill member between the fill apertures.

17. A molding mechanism for molding food patties from a whole fiber food product, comprising:
- a fill member having a planar surface and having a plurality of fill apertures therethrough;
- a cover member having a planar surface disposed in parallel spaced relation to the planar surface of the fill member;
- a mold plate having opposed planar surfaces, positioned between the planar surfaces of the fill member and the cover member in close fitting relation thereto, the mold plate having a corresponding plurality of mold cavities therethrough, each mold cavity having a size and configuration subsstantially matched to one of the fill apertures;
- mold plate drive means for cyclically moving the mold plate between a fill position in which the mold cavities are aligned one-for-one with the fill apertures and a discharge position in which the mold cavities are displaced beyond one side of the fill member;
- pump means connected to the fill apertures through a fill passage, for pumping a whole fiber food product, under pressure, through the fill passage and the fill apertures and into the mold cavities to form food patties in the mold cavities;
- discharge means for pushing molded food patties from the mold cavities at the discharge portion of the mold plate; and
- a plurality of knives affixed to the fill member and projecting toward the fill passage from the portions of the fill member intermediate the fill apertures, for cutting food product segments that would otherwise tend to bridge those portions of the fill member.

* * * * *